United States Patent
Ke et al.

(10) Patent No.: US 8,266,650 B2
(45) Date of Patent: Sep. 11, 2012

(54) MULTIPLEX TRANSMISSION INTERFACE METHOD OF ELECTRONIC SERVICE GUIDE

(75) Inventors: Zunyou Ke, Shenzhen (CN); Qinghua Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 378 days.

(21) Appl. No.: 12/522,819

(22) PCT Filed: Dec. 11, 2007

(86) PCT No.: PCT/CN2007/003533
§ 371 (c)(1),
(2), (4) Date: Oct. 30, 2009

(87) PCT Pub. No.: WO2008/083552
PCT Pub. Date: Jul. 17, 2008

(65) Prior Publication Data
US 2010/0064319 A1  Mar. 11, 2010

(30) Foreign Application Priority Data
Jan. 11, 2007  (CN) .......................... 2007 1 0001264

(51) Int. Cl.
H04N 7/173 (2011.01)
H04N 7/10 (2006.01)
H04N 7/025 (2006.01)
H04N 5/445 (2011.01)

(52) U.S. Cl. ................ 725/32; 725/34; 725/35; 725/36; 725/54; 725/136; 725/137; 725/116; 725/117

(58) Field of Classification Search ........................ None
See application file for complete search history.

(56) References Cited

U.S. PATENT DOCUMENTS

| 6,389,593 B1 * | 5/2002 | Yamagishi ........................ 725/9 |
| 7,032,236 B1 * | 4/2006 | Ozkan et al. .................... 725/39 |
| 7,594,247 B2 * | 9/2009 | Arai et al. ....................... 725/54 |
| 2004/0083489 A1 * | 4/2004 | Bansal et al. ................... 725/44 |

(Continued)

FOREIGN PATENT DOCUMENTS

CN  1154187 A  7/1997

(Continued)

OTHER PUBLICATIONS

European Patent Office, Extended European Search Report for EP Application No. EP 07845889 (PCT/CN2007/003533) dated Jan. 16, 2012.

(Continued)

*Primary Examiner* — Nasser Goodarzi
*Assistant Examiner* — Fred Hsiungfei
(74) *Attorney, Agent, or Firm* — Bright IP Law Office (57) ABSTRACT

The present invention discloses an electronic service guide multiplex transmission interface method comprising: Step S102 in which an electronic service guide system generates electronic service guide broadcasting data according to system configuration data and the electronic service guide broadcasting data is sent to a multiplexer via a interface; the step S104 in which the multiplexer receives and multiplexes the electronic service guide broadcasting data and the multiplexed electronic service guide broadcasting data is transmitted to a modulation emitter; step S106 in which the modulation emitter receives the multiplexed electronic service guide broadcasting data, modulates the data and transmits the modulated data to user terminal; and step S108 in which the user terminal is tuned to receive the electronic service guide broadcasting data and demultiplexes it, and generates, stores and displays electronic service guide service navigation information.

13 Claims, 5 Drawing Sheets

U.S. PATENT DOCUMENTS

| | | |
|---|---|---|
| 2004/0221307 A1 | 11/2004 | Arai et al. |
| 2006/0053450 A1 | 3/2006 | Saarikivi et al. |
| 2006/0195464 A1* | 8/2006 | Guo .............................. 707/101 |
| 2007/0022451 A1* | 1/2007 | Lee et al. ......................... 725/86 |
| 2007/0089123 A1* | 4/2007 | Park ................................. 725/1 |
| 2008/0010342 A1* | 1/2008 | Gebhardt et al. .............. 709/204 |
| 2009/0031335 A1* | 1/2009 | Hendricks et al. ................. 725/1 |
| 2009/0077588 A1* | 3/2009 | Sugai .............................. 725/44 |

FOREIGN PATENT DOCUMENTS

| | | |
|---|---|---|
| CN | 1264976 A | 8/2000 |
| CN | 1674673 A | 9/2005 |
| CN | 1871814 A | 11/2006 |
| CN | 101018356 | 8/2007 |

OTHER PUBLICATIONS

European Broadcasting Union-Union Europeene De Radio-Television (EBU-UER), "Digital Video Broadcasting (DVB); Specification for Service Information (SI) in DVB systems," May 1, 2006, pp. 13-28, ETSI EN 300 468 V1.7.1, ETSI, France.

European Broadcasting Union-Union Europeene De Radio-Television (EBU-UER), "Digital Video Broadcasting (DVB); IP Datacast over DVB-H: Electronic Service Guide (ESG)," Nov. 1, 2006, pp. 15-34 and 40-47, ETSI TS 102 471 V1.2.1, ETSI, France.

* cited by examiner

MULTIPLEX TRANSMISSION INTERFACE METHOD OF ELECTRONIC SERVICE GUIDE

FIELD OF THE INVENTION

The present invention relates to communication field, in particular to a multiplex transmission interface method of electronic service guide.

BACKGROUND OF THE INVENTION

Mobile-tv service is a typical application of the mobile multimedia broadcast technique. Mobile users mounted up to almost 40 million in 2006 in China, and the families possessing TV mounted up to 35 million. It can be imagined how large the market produced by mobile-tv service will be, if the mobile-tv service is achieved by combining the mobile and TV services. From the oversea predication data, it is shown that mobile-tv users will be up to 120 million all over the world with 40 million mobile-tv users in China. With the mobile user group and broadcast tv user group being so huge, the network operator and equipment provider in various countries pay much attention to this service, hoping it becomes a new growth point of the mobile multimedia service. As a result, mobile-tv is a hard-won opportunity for domestic related industries, and at the same time it is a perfect chance to achieve independent innovations.

In the viewpoint of the mobile operator, the mobile-tv can utilize, to the maximum degree, the ability provided by network, so as to provide more abundant services. In the viewpoint of the broadcast company, the mobile-tv is a new channel of tv broadcasting such that the content resource can be sufficiently used, the range of the users is enlarged, and the mobilization for the broadcast network can be achieved.

In the mobile multimedia broadcast, user terminal uses electronic service guide (ESG) information to fulfill the function of service navigation.

The electronic service guide of mobile multimedia broadcast mainly includes all or part of the data record of a service table, a service extending information table, a content table, a service parameter table and an organization table and so on.

SUMMARY OF THE INVENTION

The main object of the present invention is to provide a mechanism of multiplex transmission interface of electronic service guide.

In order to obtain the above object, the present invention provides a multiplex transmission interface method of electronic service guide.

The method comprises the following steps: S102 in which an electronic service guide system generates electronic service guide broadcasting data according to system configuration data and the electronic service guide broadcasting data is sent to a multiplexer via a interface; S104 in which the multiplexer receives and multiplexes the electronic service guide broadcasting data and the multiplexed electronic service guide broadcasting data is transmitted to a modulation emitter; S106 in which the modulation emitter receives the multiplexed electronic service guide broadcasting data, modulates the data and transmits the modulated data to user terminal.

Meanwhile, the method further comprises the step S108 in which the user terminal is tuned to receive the electronic service guide broadcasting data and demultiplexes it, and generates, stores and displays electronic service guide service navigation information.

Meanwhile, interface parameters include an electronic service guide broadcasting data entity, data type, data length and service identifier. Moreover, the system configuration data includes multiplex service identifier, IP, port and connection manner for connecting the multiplexer, segment data length and data type indicator wherein the data type includes electronic service guide basic description table data, electronic service guide general table data and P/F data.

In addition, in the step S102, generating the electronic service guide broadcasting data comprises that the electronic service guide system receives a request which indicates generating the electronic service guide broadcasting data, reads in the system configuration data and original data, processes the inquired original data one by one depending on generation parameters, formats the original data, and selectively compresses the formatted electronic service guide broadcasting data depending on the data type and stores individual electronic service guide broadcasting data.

Meanwhile in the case of the electronic service guide general table data type, the formatted electronic service guide broadcasting data is compressed, but in the case of the electronic service guide basic description table data and P/F data, the formatted electronic service guide broadcasting data is not compressed.

In addition, in the step S102 of this method, sending the electronic service guide broadcasting data comprises: the electronic service guide system receives a request used to indicate scheduling sending, and reads in the system configuration data and the electronic service guide broadcasting data; and the electronic service guide system, according to the data type and the segment data length, segments the electronic service guide broadcasting data and packages it into units, establishes the connection to the multiplexer, and sends the electronic service guide broadcasting data, wherein the parameters include the electronic service guide scheduling parameter, the electronic service guide transmitting parameter and the electronic service guide debugging parameter.

As for the electronic service guide general table data type, the electronic service guide broadcasting data is segmented depending on the segment data length and the cell packaging is performed, and it is divided as multiple data segments which are sent sequentially. As for the electronic service guide basic description table data and P/F data, the electronic service guide broadcasting data is not segmented and is sent out in one go.

Meanwhile, by means of user authentication information and password authentication information, connection is established between the electronic service guide system and the multiplexer. Mutex signal amount control access is used in the process of generating the electronic service guide broadcasting data and the process of sending the electronic service guide broadcasting data.

In addition, in the step S104, that the multiplexer receives the electronic service guide broadcasting data comprises: the electronic service guide broadcasting data is received and processed and it is determined whether the electronic service guide broadcasting data is received successfully, and afterward if it is determined that the reception fails, the electronic service guide broadcasting data is discarded and failure message is sent to the electronic service guide system, informing the electronic service guide system to resend it, and if it is determined that the reception succeeds, the data type is estimated; and the electronic service guide broadcasting data constitutes corresponding data, depending on the service identifier of the interface and the data type.

Meanwhile, as for the electronic service guide general table data and P/F data type, the electronic service guide broadcasting data unit constitutes multiplex sub-frame data corresponding to the service identifier. As for the electronic service guide basic description table data, the electronic service guide broadcasting data unit constitutes control information table data.

Meanwhile, processing the electronic service guide broadcasting data comprises: according to the data type, the electronic service guide broadcasting data is parsed to obtain data information and CRC information which are then verified; and it is checked whether the received electronic service guide broadcasting data length is identical to a definition length.

In addition, that the multiplexer receives the electronic service guide broadcasting data further comprises: receiving a request for establishing connection and verifying the connection request; and if the verification is passed, connection information is established and maintained, and as for the connection information unused overtime, the connection is cancelled.

The above technical solution of the present invention is helpful for optimizing the system entire construction and the individual arrangement of ESG system, facilitating the maintenance and management of the system.

Other features and advantages of the present invention are set forth in the following description, and become obvious partly from the description, or learned by implementing the present invention. The objects and other advantages of the present invention can achieved and obtained by the structure indicated specifically in the written description, claims and figures.

BRIEF DESCRIPTION OF THE DRAWINGS

The drawings constituting a part of the application provide a further understanding to the present invention and are used for explaining the present invention along with the embodiments of the present invention without limiting the present invention, in which.

DETAILED DESCRIPTION

Hereinafter, the preferable embodiments of the present invention are described in conjunction with Figures. It should be appreciated that the preferable embodiments described herein are used for describing and explaining the present invention but not for limiting the present invention.

In the present embodiment, the present invention has the main logic entities including ESG system, a multiplexer, a modulation emitter and a mobile terminal etc. whose functions are described as follows:

ESG system: in charge of the maintenance management on ESG information original table data record, such as addition, deletion and modification, the maintenance management on the system configuration data, and generating, broadcasting scheduling and sending the ESG broadcasting data;

Multiplexer: obtaining ESG and other data of AV and the like, multiplexing ESG data and the like into logic channel, and sending it to the broadcasting emitting station to modulate and emit it.

Modulation emitter: modulating and emitting the multiplexed data;

Mobile terminal: including the mobile communication devices such as mobile cell, being capable of receiving the data transmitted by the broadcasting network channel, such as ESG information, and storing, updating, inquiring, displaying and receiving user operation control for ESG.

Figure 1:
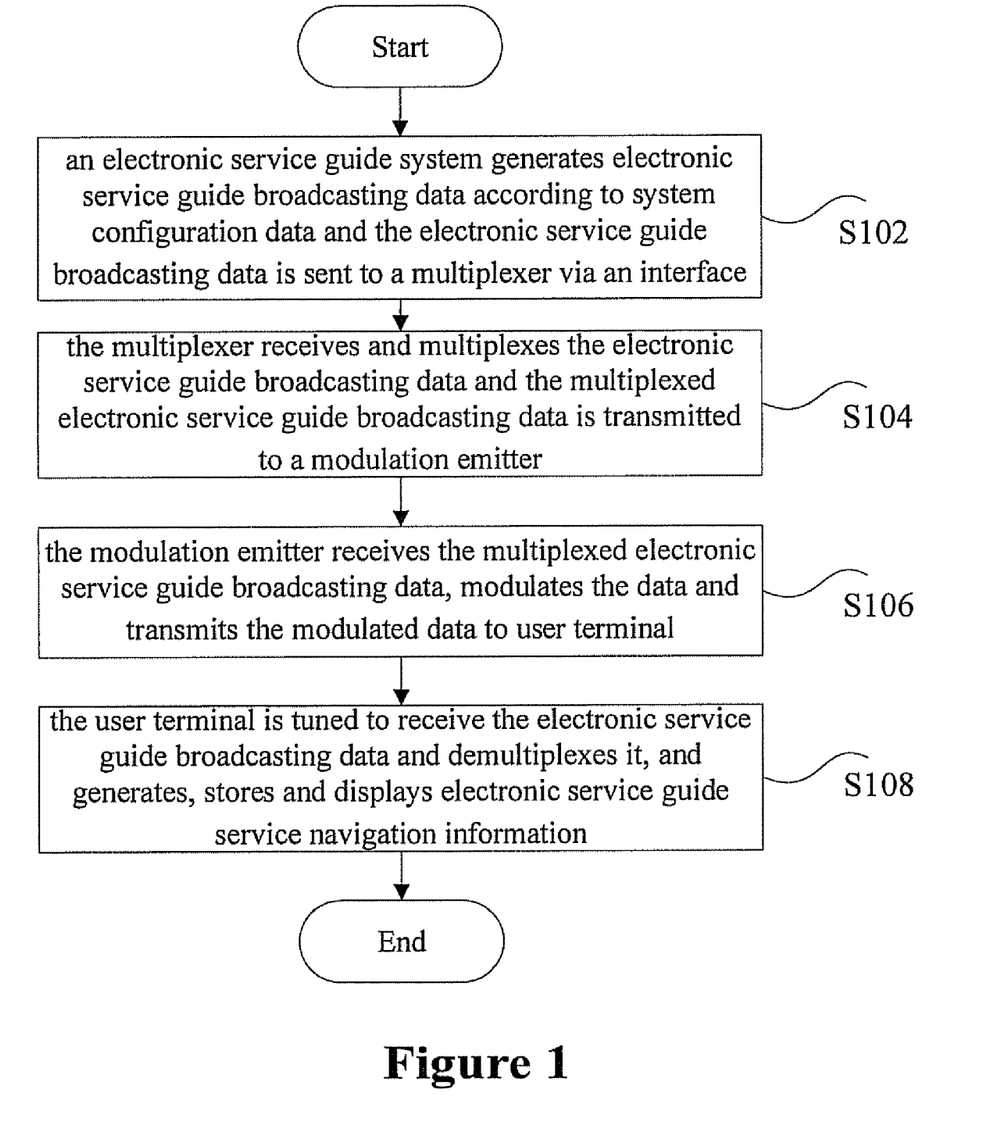
FIG. 1 is a flowchart of the multiplex transmission interface method of electronic service guide according to the embodiment of the present invention.

As shown in FIG. 1, the multiplex transmission interface method of electronic service guide according to the embodiment of the present invention comprises: the step S102 in which an electronic service guide system generates electronic service guide broadcasting data according to system configuration data and the electronic service guide broadcasting data is sent to a multiplexer via a interface; the step S104 in which the multiplexer receives and multiplexes the electronic service guide broadcasting data and the electronic service guide broadcasting data multiplexed is transmitted to a modulation emitter; the step S106 in which the modulation emitter receives the multiplexed electronic service guide broadcasting data, and modulates and sends it to the user terminal; and the step S108 in which the user terminal is tuned to receive the electronic service guide broadcasting data and demultiplexes it, and generates, stores and displays the electronic service guide service navigation information.

Figure 2:
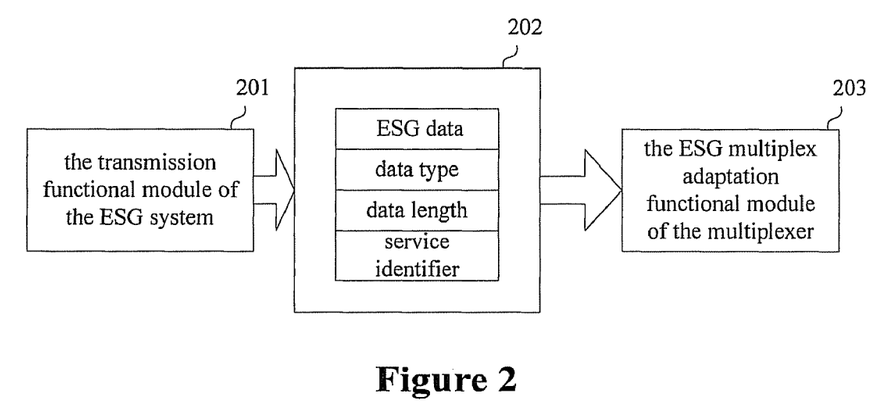
FIG. 2 is a schematic view of the multiplex transmission interface method of electronic service guide according to the embodiment of the present invention.

Meanwhile, as shown in FIG. 2, the interface parameters includes an electronic service guide broadcasting data entity, data type, data length and service identifier. Moreover, the system configuration data includes multiplex service identifier, connection multiplexer IP, port and connection manner, segment data length and data type indicator wherein the data type includes electronic service guide basic description table data, electronic service guide general table data and P/F data.

In addition, in the step S102, generating the electronic service guide broadcasting data comprises that the electronic service guide system receives a request which indicates generating the electronic service guide broadcasting data, inquires for and reads in the system configuration data and original data, processes the inquired original data one by one depending on the generation parameters, formats the original data, and selectively compresses the formatted electronic service guide broadcasting data depending on the data type and stores individual electronic service guide broadcasting data, wherein the parameters include electronic service guide scheduling parameter, electronic service guide transmission parameter and electronic service guide debug parameter.

Figure 3:
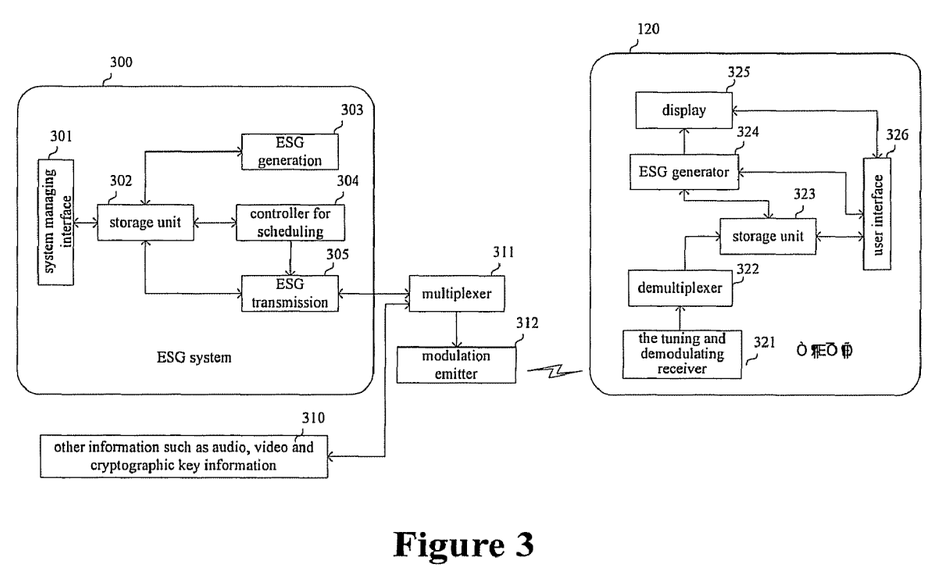
FIG. 3 is a brief schematic view of the multiplex transmission interface method of electronic service guide according to the embodiment of the present invention.

As shown in FIG. 3, the multiplex transmission construction includes ESG system 300, a multiplexer 311, a modulation emitter 312 and a mobile terminal 320 etc. whose functions are described as follows:

ESG system 300: in charge of the maintenance management on ESG information original table data record such as addition, deletion and modification, the maintenance management on the system configuration data, and generating, broadcasting scheduling and sending the ESG broadcasting data;

Multiplexer 311: obtaining ESG and other data of AV and the like, multiplexing ESG data and the like into logic channel, and sending it to the broadcasting emitting station to modulate and emit it.

Modulation emitter 312: modulating and emitting the multiplexed data;

Mobile terminal 320: including the mobile communication devices such as mobile cell, being capable of receiving the data transmitted by the broadcasting network channel, such as ESG information, and storing, updating, inquiring, displaying and receiving user operation control for ESG.

The multiplexer multiplexes the channel, multiplexing the ESG information data, AV data and other configuration control data into a given multiplex frame to transmit. A manager, by means of the ESG system, manages the interface and maintains and manages the ESG original table data and the system configuration data. The manager can maintain and manage the ESG original table data by the following steps:

(1) the manager operates to enter the ESG data maintaining and managing interface;

(2) providing choices of adding, deleting and modifying the operational interface, and displaying the inquired result, the default being of displaying the service title index and all information of the service table;

(3) selecting the information such as maintaining and managing the service, program, organization or service access etc.;

(4) selecting to add a certain ESG data, entering the corresponding editing and inputting interface, and clicking and confirming to submit the operational result;

(5) selecting to modify a certain ESG data, entering the corresponding editing and inputting interface, and clicking and confirming to submit the operational result;

(6) selecting to delete a certain data, displaying a deletion-confirm interface and confirming the deletion corresponding record after the deletion; and (7) the manager operates to exit the ESG data maintaining interface.

Returning to FIG. 1, in the case of the electronic service guide general table data type, the formatted electronic service guide broadcasting data is compressed, but in the case of the electronic service guide basic description table data and P/F data, the formatted electronic service guide broadcasting data is not compressed.

Preferably, the manager maintains and manages the ESG basic description table data, comprising the list head, multiple ESG data unit length and corresponding ESG data unit, and CRC verification code. The ESG data unit further consists of ESG head, ESG data payload and CRC verification code. The CRC verification code is of 32 bits, including CRC value with the CRC aiming at the additional data and the list head of the local section.

Meanwhile, the parameter segments included in the list head individually represent as follows:

table indicator, segment length, segment sequential number, the number of the segments, time zone, character encoding type, updating sequential number, additional data indicator, the number of the data units, network number and the number of the ESG tables.

Moreover, the ESG basic description table further includes one or more ESG parameters, the number of which depends on the number of the above ESG tables. Each of the ESG table parameters includes the ESG indicator, the data indicator, the table updating sequential number and service identifier.

Optionally, it can be prescribed that no ESG data unit is added into the ESG basic description table, and herein the table does not include the ESG data unit the length data thereof. Accordingly, the list head unnecessarily includes the additional data indicator, the number of the data units and so on.

In addition, in the step S102 in FIG. 1, sending the electronic service guide broadcasting data comprises: the electronic service guide system receives a request used to indicate scheduling sending, and reads in the system configuration data and the electronic service guide broadcasting data; and the electronic service guide system, according to the data type and the segment data length, segments the electronic service guide broadcasting data and performs cell packaging, establishes the connection to the multiplexer, and sends the electronic service guide broadcasting data.

As for the electronic service guide general table data type, the electronic service guide broadcasting data is segmented depending on the segment data length and the cell packaging is performed, and it is divided as multiple data segments which are sent sequentially. As for the electronic service guide basic description table data and P/F data, the electronic service guide broadcasting data is not segmented and is sent in one go.

Meanwhile, by means of user authentication information and password authentication information, connection is established between the electronic service guide system and the multiplexer. Mutex signal amount control access is used in the process of generating the electronic service guide broadcasting data and the process of sending the electronic service guide broadcasting data.

The manager maintains and manages the ESG system configuration data wherein the configurable parameter includes ESG generating parameter, ESG scheduling parameter, ESG transmission parameter and ESG debug parameter which particularly comprises the following:

(1) the ESG generating parameter includes the title of the generating parameter, identification number, data format, data type indicator (ESG general table data, ESG basic description table data, P/F data etc.) and section data table;

(2) as for the ESG general table data, what can be selected are service table, content table, access table, organization table etc., the attributes including whether it is automatically updated, and also including automatic updating time period, compression indicator and compression algorithm type. The organization table can further be provided with the time range of data;

(3) as for P/F data, only the service table is involved while the rest such as the time range of data, the automatic updating time period, the compression indicator and the compression algorithm type are ignored and unused. The automatic updating time for each channel P/F data is the starting time of the current program of such channel;

(4) as for the ESG basic description table data, only the basic description table is involved, and the rest such as the time range of data, the automatic updating time period, the compression indicator and the compression algorithm type are ignored and unused wherein said automatic updating means that when the data thereof are varied, for example, the table updating sequential number is changed;

(5) the ESG transmission parameter includes selection ESG generating data title, identification number, multiplex service identifier (ServiceID), the largest length of data segment, the updating sequential number, the connection configuration of multiplexer etc., such as the multiplexer IP address and port, the connection manner and so on.

(6) the ESG scheduling parameter includes bandwidth limitation, the selection ESG generating data title, the identification number, carousel period, total carousel period, data amount, and bandwidth occupation calculated value.

The ESG debug parameter includes invocation/termination of debug, the selection ESG generating data title, the identification number, debug type (non-debug, error code, missed data segment, random). The error code and the missed segment can occur simultaneously, both of which can randomly select or specify data segment, and the duration period or the interval period are set, or the mode is adjusted (the particular table, the data segment and the number of cycles are generated randomly).

In addition, in the step S104, that the multiplexer receives the electronic service guide broadcasting data comprise: it receives and processes the electronic service guide broadcasting data and determines whether the electronic service guide broadcasting data is received successfully; if it is determined that the reception is fail, then the electronic service guide broadcasting data is discarded and a failure message is sent to the electronic service system to inform the electronic service guide system to resent it; and if it is determined that the reception is successful, then the data type is determined; and the electronic service guide broadcasting data forms corresponding data depending on the interface service identifier and the data type.

Meanwhile, as for the electronic service guide general table data and P/F data type, the electronic service guide broadcasting data unit form the multiplex sub-frame data corresponding to the service identifier and as for the electronic service guide basic description table data, the electronic service guide broadcasting data unit forms control information table data.

Meanwhile, processing the electronic service guide broadcasting data comprises: according the data type, the electronic service guide broadcasting data is parsed to obtain the data information and CRC information and verify them; and it is checked whether the length of the received electronic service guide broadcasting data is identical to the definition length.

Additionally, that the multiplexer receives the electronic service guide broadcasting data further comprises: a request for establishing connection is received and verified; and if the verification is passed, then the connection information is established and maintained; and in the case that the connection information is unused for overtime, the connection is cancelled.

As shown in FIG. 3, the function of each module of the mobile terminal is:

the tuning and demodulating receiver 321: providing to the mobile terminal the function of tuning and receiving broadcasting data;

the demultiplexer 322: demultiplexing the multiplex data received by the module 321 and stores it in a storage unit;

the storage unit 323: providing the function of storing data, and the interface for reading in writing in data;

the ESG generator 324: receiving the control from the module 326 and inquiring the module 323, and generating ESG page-layout data by using result set and outputting the page-layout data and the like to the display;

the display 325: displaying user operation interface and ESG page-layout; and the user interface 326: providing the function of reading-in and writing-in the data of module 323 and the function of controlling the module 324, and providing the function of user operation interface.

In addition, FIG. 2 shows the interface between the transmission functional module of ESG system and ESG multiplex adaptation functional module of the multiplexer, in which:

module 201: the transmission functional module of the ESG system;

module 202: interface parameters list and parameters list which represent:

ESG data: which is the transmitted ESG data entity including the content that is specified by the data type;

data type: which is divided into ESG basic description table data, ESG general table data, and P/F data and so on;

data length, which is the length of segment number of ESG data;

service identifier: indicating the service identifier (ServiceID) used by ESG data multiplex transmission; and module 203: the ESG multiplex adaptation functional module of the multiplexer.

In the present embodiment, the ESG data typically is the data unit encapsulated according to multiplex requirement, for example, P/F data and the data of the individual tables of ESG. As for ESG basic description table, the data is encapsulated according to the format defined in the table.

Figure 4:
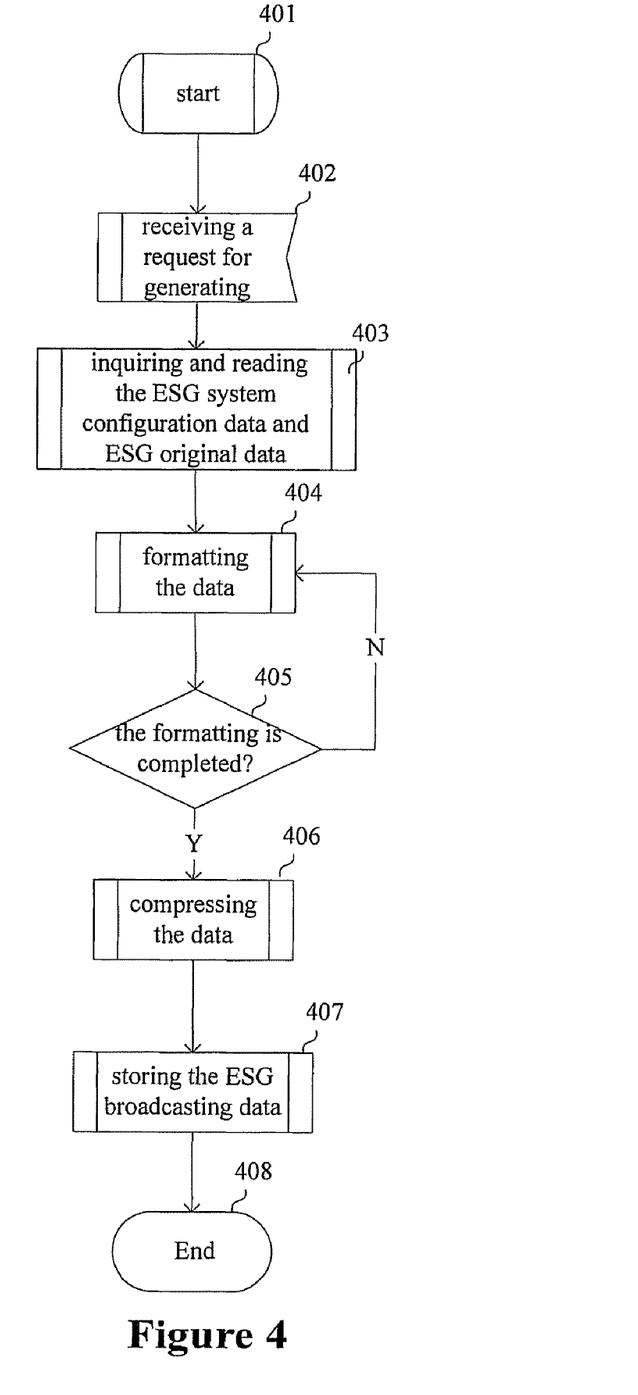
FIG. 4 is a flowchart indicating that ESG system generates ESG broadcasting data in the multiplex transmission interface method of electronic service guide according to the embodiment of the present invention.

FIG. 4 shows a flowchart indicating the ESG system generates ESG broadcasting data in a practical procedure according to the method of the present embodiment, which is described as follows:

Step 401: actuating the ESG system to generate ESG broadcasting data, the process of which may be operated by the operator or performed automatically;

Step 402: receiving the requesting information for generating ESG broadcasting data;

Step 403: inquiring and reading in the ESG system configuration data and the ESG original data; and processing the inquired ESG original data record one by one according to ESG generating parameter;

Step 404: defining the ESG original data as formatted, according to ESG generating parameter, for example, the defining manner of table data or XML file, etc.

Step 405: if the formatting process is completed, proceeding; otherwise, going to 304 to format it continuously;

Step 406: as for the ESG general table data, the formatted ESG data is compressed as required according to the ESG generating parameter, and as for other data type, such as P/F data and the ESG basic description table data, the compression is unnecessary;

Step 407: storing the ESG broadcasting data, such as storing it as data file; and in order to deal with the contradiction that the sending process may read the data, such process and the sending process use mutex signal amount control access;

Step 408: existing.

Figure 5:
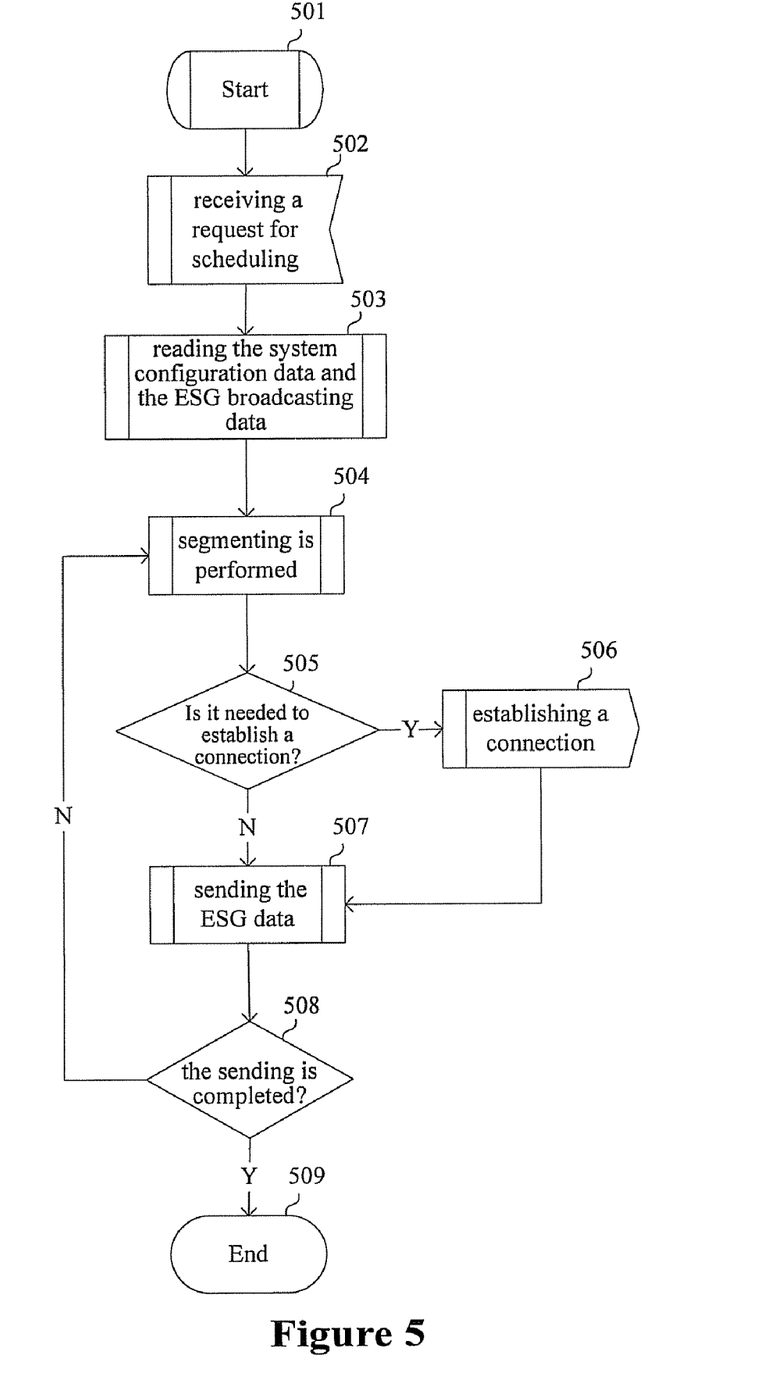
FIG. 5 is a flowchart indicating that ESG system generates ESG broadcasting data in the multiplex transmission interface method of electronic service guide according to the embodiment of the present invention.

In addition, FIG. 5 shows a flowchart indicating that the ESG system sends the ESG broadcasting data, the steps as follows:

Step 501: actuating the ESG system to send ESG broadcasting data, the process of which may be operated by the operator or performed by the scheduling process;

Step 502: receiving the request information sent by the scheduling with the request information including the indication that which ESG broadcasting data is sent;

Step 503: reading in the system configuration data and the ESG broadcasting data wherein the system configuration data includes multiplex service identifier, the IP, port and connection manner for connecting the multiplexer, segment data length, and data type indicator;

Step 504: as for the ESG general table data, according to the segment data length, the ESG broadcasting data is segmented and encapsulated as ESG data unit, and is sent in form of data segment; and the segment data can, as intermediate data, be stored for the purpose of resending while other data, such as P/F data and the ESG basic description table data, need not to be segmented.

Step 505: before sending the data segment, the connection manner is to be determined; if it is needed to establish a connection in advance but no connection is available, then a connection request is sent to the multiplexer by 406, otherwise, 407 is used to send the data;

Step 506: sending a connection request to the multiplexer with the connection parameters including user and password authentication information;

Step 507: sending the ESG data wherein the ESG data is sent with the interface parameter configured as shown in FIG. 2 and in order to deal with the contradiction that the generating process may use the data, such process and the sending process use mutex signal amount control access; and as for the ESG general table data, it can be divided into plural data segments which are sent sequentially and as for other data such as P/F data and the ESG basic description table data, it can be sent in one go; and in addition, as for the ESG general table data and P/F data, it needs to be encapsulated into data unit before sending;

Step 508: determining whether all data has been sent; if No, then returning 404 to continue the sending; otherwise, returning 409 to exit; and Step: exiting.

Figure 6:
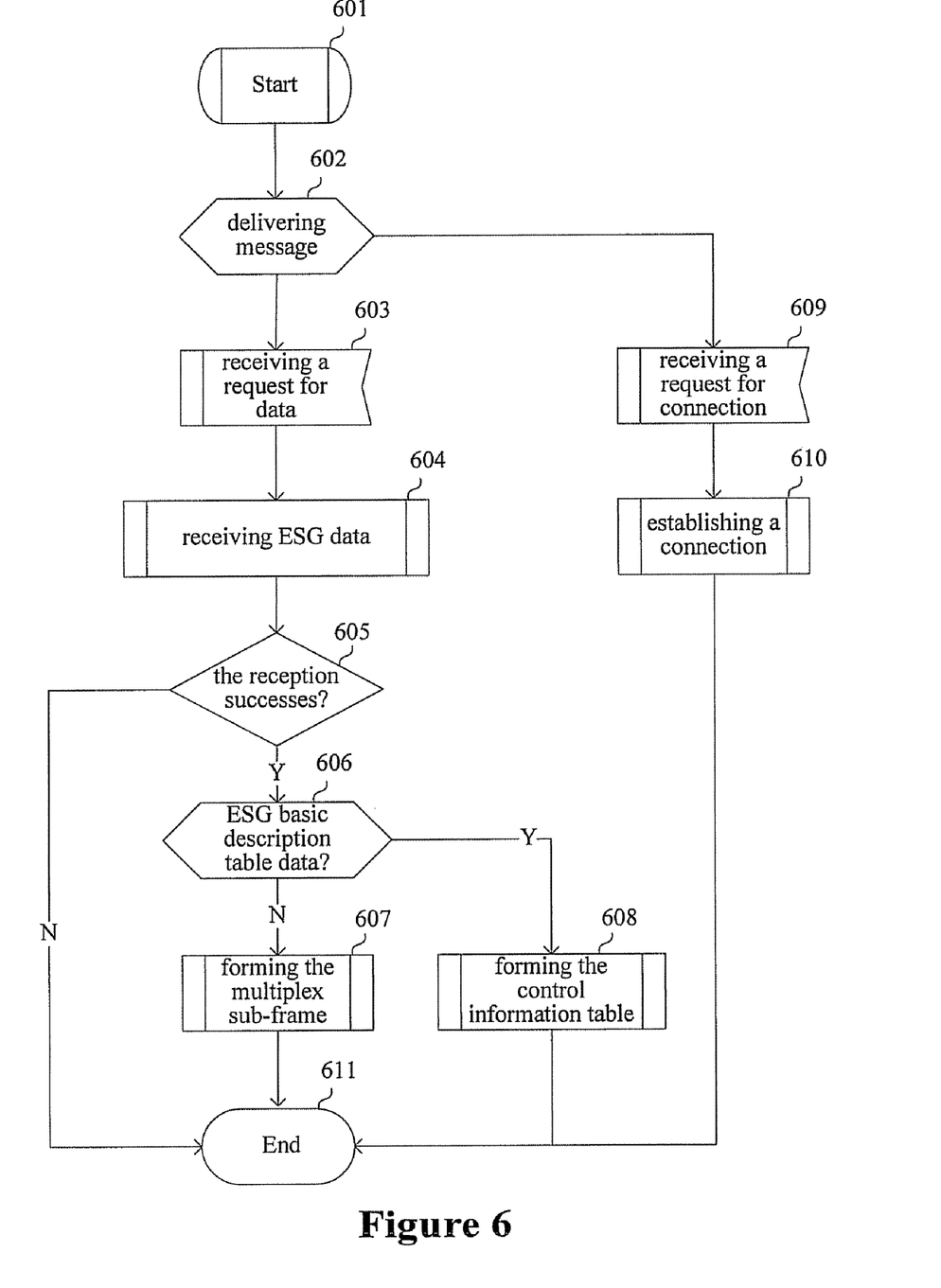
FIG. 6 is a flowchart indicating that the multiplexer receives ESG broadcasting data in the multiplex transmission interface method of electronic service guide according to the embodiment of the present invention.

FIG. 6 shows a flowchart indicating that the multiplexer receives the ESG broadcasting data with the steps as follows:

Step 601: the transmitting process of ESG system actuates the multiplexer to receive the ESG data;

Step 602: calling different processing method depending on different information type wherein the information type may be a request for receiving data, a request for establishing connection and so on;

Step 603: in case of the request for receiving data, parsing the request information depending on the interface parameter defined in FIG. 2;

Step 604: receiving and processing the data, which includes that the ESG data is parsed according to the data type of the interface information to obtain the data information and CRC information and verify them; and checking whether the length of the received data is identical to the definition length;

Step 605: determining whether the data is received successfully for this time, wherein the reasons of unsuccessful reception include that the data verification is fail, the data length is wrong and so on; if unsuccessful, the data is discarded and a failure message can be sent to the ESG system which processes it by the transmission process thereof; returning 511 to exist;

Step 606: determining the data type of the interface information;

Step 607: as for the ESG general table data, the ESG data unit forms multiplex sub-frame data corresponding to the service identifier according to the interface service identifier; and as for P/F data, the data unit forms multiplex sub-frame data corresponding to the service identifier, so as to be used for the multiplex transmission of the service channel;

Step 608: as for the ESG basic description table data, it forms a control information table data to be used for the multiplex transmission of the control channel;

Step 609: receiving a request for establishing connection;

Step 610: If the verification is passed, then the connection information is established and maintained, and if connection information is unused overtime, then the connection is removed; and Step 611: exiting.

The above is merely the preferable embodiments of the present invention but not used for limiting the present invention. As for those skilled in the art, various changes and variations can be made to the present invention. Within the spirit and principle of the present invention, all such changes, substitutions and improvements should be covered by the scope of the present invention.

What is claimed is:

1. An electronic service guide multiplex transmission interface method, comprising:

generating, by an electronic service guide system, electronic service guide broadcasting data according to system configuration data, and sending the electronic service guide broadcasting data to a multiplexer via an interface, wherein the system configuration data comprises multiplex service identifier, IP and port and connection manner for connecting the multiplexer, segment data length and data type indicator, wherein parameters of the interface comprise an electronic service guide broadcasting data entity, data type, data length, and service ID;

receiving and multiplexing, by the multiplexer, the electronic service guide broadcasting data, and transmitting the multiplexed electronic service guide broadcasting data to a modulation emitter; and the modulation emitter receiving the multiplexed electronic service guide broadcasting data, modulating the data, and transmitting the modulated data to user terminal;

wherein sending the electronic service guide broadcasting data further comprises: the electronic service guide system receiving a request used to indicate scheduling sending, and reading in the system configuration data and the electronic service guide broadcasting data; and the electronic service guide system, according to the data type and the segment data length, segmenting the electronic service guide broadcasting data and packaging it into units, establishing the connection to the multiplexer, and sending the electronic service guide broadcasting data.

2. The multiplex transmission interface method according to claim 1, further comprising:

the user terminal receiving the electronic service guide broadcasting data, and demultiplexing it, and generating, storing and displaying electronic service guide service navigation information.

3. The multiplex transmission interface method according to claim 1, wherein the data comprises electronic service guide basic description table data, electronic service guide general table data and present/following data.

4. The multiplex transmission interface method according to claim 1, wherein generating the electronic service guide broadcasting data comprises:

the electronic service guide system receiving a request which indicates generating the electronic service guide broadcasting data, inquiring and reading in the system configuration data and original data;

processing the inquired original data one by one depending on generation parameters, and formatting the original data; and selectively compressing the formatted electronic service guide broadcasting data depending on the data type, and storing individual electronic service guide broadcasting data.

5. The multiplex transmission interface method according to claim 4, wherein the parameters comprise electronic service guide scheduling parameter, electronic service guide transmitting parameter and electronic service guide debugging parameter.

6. The multiplex transmission interface method according to claim 5, wherein as for the electronic service guide general table data type, the formatted electronic service guide broadcasting data is compressed, and as for the electronic service guide basic description table data and present/following data, the formatted electronic service guide broadcasting data is not compressed.

7. The multiplex transmission interface method according to claim 6, wherein as for the electronic service guide general table data type, the electronic service guide broadcasting data is segmented depending on the segment data length and packaged into units, and the electronic service guide broadcasting data is divided as multiple data segments which are sent sequentially; and as for the electronic service guide basic description table data and the present/following data, the electronic service guide broadcasting data is not segmented and is sent out in one go.

8. The multiplex transmission interface method according to claim 7, wherein by means of user authentication information and password authentication information, connection is established between the electronic service guide system and the multiplexer.

9. The multiplex transmission interface method according to claim 8, wherein Mutex signal amount control access is used in the process of generating the electronic service guide broadcasting data and the process of sending the electronic service guide broadcasting data.

10. The multiplex transmission interface method according to claim 9, wherein the multiplexer receiving the electronic service guide broadcasting data comprises:

receiving and processing the electronic service guide broadcasting data and determining whether the electronic service guide broadcasting data is received successfully;

if it is determined that the reception fails, discarding the electronic service guide broadcasting data and sending a failure message to the electronic service guide system, informing the electronic service guide system to resend it; and if it is determined that the reception succeeds, estimating the data type;

wherein the electronic service guide broadcasting data constitutes corresponding data, depending on the service identifier of the interface and the data type.

11. The multiplex transmission interface method according to claim 10, wherein as for the electronic service guide general table data and present/following data type, the electronic service guide broadcasting data unit constitutes multiplex sub-frame data corresponding to the service identifier, and as for the electronic service guide basic description table data, the electronic service guide broadcasting data unit constitutes control information table data.

12. The multiplex transmission interface method according to claim 11, wherein processing the electronic service guide broadcasting data comprises:

according to the data type, parsing the electronic service guide broadcasting data to obtain the data information and CRC information which are then verified; and checking whether the length of the received electronic service guide broadcasting data is identical to a definition length.

13. The multiplex transmission interface method according to claim 10, wherein the multiplexer receiving the electronic service guide broadcasting data further comprises:

receiving a request for establishing connection and verifying the connection request; and if the verification is passed, establishing and maintaining connection information, and as for the connection information unused overtime, canceling the connection.

\* \* \* \* \*